United States Patent [19]

Matsumoto

[11] Patent Number: 5,721,870
[45] Date of Patent: Feb. 24, 1998

[54] LOCK CONTROL FOR A SHARED MAIN STORAGE DATA PROCESSING SYSTEM

[75] Inventor: Kazuya Matsumoto, Yamanashi, Japan

[73] Assignee: NEC Corporation, Tokyo, Japan

[21] Appl. No.: 447,026

[22] Filed: May 22, 1995

[30] Foreign Application Priority Data

May 25, 1994 [JP] Japan .................... 6-110850

[51] Int. Cl.$^6$ ..................... G06F 12/14
[52] U.S. Cl. ............... 395/479; 395/490; 395/472
[58] Field of Search .................. 395/472, 479, 395/490

[56] References Cited

U.S. PATENT DOCUMENTS

| | | | |
|---|---|---|---|
| 4,733,352 | 3/1988 | Nakamura et al. | 395/479 |
| 4,928,225 | 5/1990 | McCarthy et al. | 395/472 |
| 4,984,153 | 1/1991 | Kregness et al. | 395/479 |
| 5,289,588 | 2/1994 | Song et al. | 395/447 |
| 5,297,269 | 3/1994 | Donaldson et al. | 395/472 |

FOREIGN PATENT DOCUMENTS

| | | |
|---|---|---|
| 0384102 | 8/1990 | European Pat. Off. . |
| 89-06011 | 6/1989 | WIPO . |

Primary Examiner—Eddie P. Chan
Assistant Examiner—Reginald G. Bragdon
Attorney, Agent, or Firm—Sughrue, Mion, Zinn, Macpeak & Seas, PLLC

[57] ABSTRACT

A lock control for a data processing system providing lock control for each data processing unit in the data processing system. The lock control is carried out based on a state of a lock variable, by a lock request control unit of a cache unit connected to the dam processing unit. On receipt of a lock request or unlock request, the lock request control unit indexes a lock address register holding an address of the lock variable and refers to a state of a lock stored in a corresponding lock status register. Various kinds of states are defined as a state of a lock variable to indicate that each lock request control unit is in a lock or unlock state. A symbol ULE indicates the state that no acquisition of a lock in all lock request control units is confirmed. Thus, an acquisition of a lock corresponding to a particular lock request control unit can be done with high speed, without confirming states of lock request control units other than the particular lock request control unit.

2 Claims, 15 Drawing Sheets

FIG. 4

| STATE | LOCAL | OTHER |
|---|---|---|
| LCK | LOCK | UNLOCK |
| ULS | UNLOCK | (UNKNOWN) |
| ULE | UNLOCK | UNLOCK |

FIG. 6

| STATE | ACTION FOR UNLOCK |
|---|---|
| ULE OR ULS OR NON | — |
| LCK | LOCAL ← ULE |

— : NOT OCCUR

FIG. 5

| LOCAL | OTHER | ACTION FOR LOCK |
|---|---|---|
| LCK | X | LOCK FAIL |
| ULE | X | LOCK SUCCESS, LOCAL←LCK |
| ULS | LCK | LOCK FAIL |
| | ULE | LOCK SUCCESS, LOCAL←LCK, OTHER←ULS |
| | ULS OR NON | LOCK SUCCESS, LOCAL←LCK |
| NON | LCK | LOCK FAIL, LOCAL←LOCK ADDRESS, LOCAL←ULS |
| | ULE | LOCK SUCCESS, LOCAL←LOCK ADDRESS, LOCAL←LCK, OTHER←ULS |
| | ULS OR NON | LOCK SUCCESS, LOCAL←LOCK ADDRESS, LOCAL←LCK |

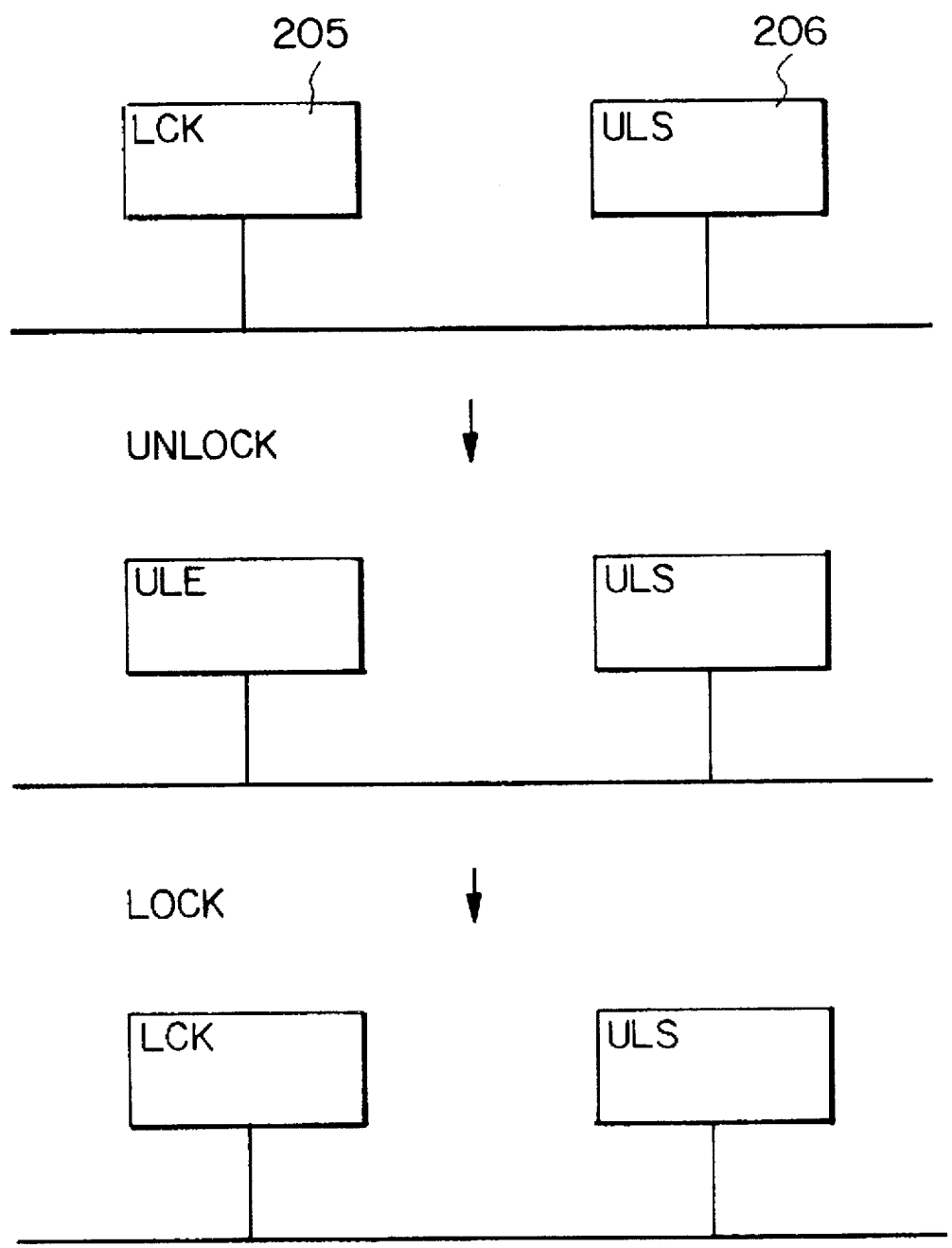

FIG. 8

| STATE | LOCAL | OTHER |
|---|---|---|
| LCK | LOCK | UNLOCK |
| ULS | UNLOCK | (UNKNOWN) |
| ULE | UNLOCK | UNLOCK |
| ULL | UNLOCK | LOCK |

FIG. 10

| LOCAL | OTHER | ACTION FOR UNLOCK |
|---|---|---|
| ULE, ULS, ULL OR NON | X | — |
| LCK | ULS OR NON | LOCAL ← ULE |
| | ULL | LOCAL ← ULE, OTHER ← ULS |
| | LCK OR ULE | — |

X: DON'T CARE
—: NOT OCCUR

FIG. 9

| LOCAL | OTHER | ACTION FOR LOCK |
|---|---|---|
| ULE | X | LOCK SUCCESS, LOCAL←LCK |
| LCK OR ULL | X | LOCK FAIL |
| ULS | ULE OR ULS | LOCK SUCCESS, LOCAL←LCK, OTHER←ULL |
| | LCK OR ULL | LOCK FAIL, LOCAL←ULL |
| | NON | LOCK SUCCESS, LOCAL←LCK |
| NON | ULE OR ULS | LOCK SUCCESS, LOCAL←LOCK ADDRESS, LOCAL←LCK, OTHER←ULL |
| | LCK OR ULL | LOCK FAIL, LOCAL←LOCK ADDRESS, LOCAL←ULL |
| | NON | LOCK SUCCESS, LOCAL←LOCK ADDRESS, LOCAL←LCK |

FIG. 12

| STATE | LOCAL | OTHER |
|---|---|---|
| LKS | LOCK | UNLOCK (MAYBE ULL) |
| LKE | LOCK | UNLOCK (NOT ULL) |
| ULS | UNLOCK | (UNKNOWN) |
| ULE | UNLOCK | UNLOCK |
| ULL | UNLOCK | LOCK |

FIG. 14

| LOCAL | OTHER | ACTION FOR UNLOCK |
|---|---|---|
| ULE, ULS, ULL OR NON | X | — |
| LKE | X | LOCAL ← ULE |
| LKS | ULS OR NON | LOCAL ← ULE |
| | ULL | LOCAL ← ULE<br>OTHER ← ULS |
| | LKS OR LKE OR ULE | — |

X: DON'T CARE
—: NO OCCUR

FIG. 13

| LOCAL | OTHER | ACTION FOR LOCK |
|---|---|---|
| ULE | X | LOCK SUCCESS, LOCAL←LKE |
| LKE OR LKS OR ULL | X | LOCK FAIL |
| ULS OR NON | ULE | LOCK SUCCESS, LOCAL←LOCK ADDRESS, LOCAL←LKE, OTHER←ULS |
| | ULS | LOCK SUCCESS, LOCAL←LOCK ADDRESS, LOCAL←LKE, OTHER←NO ACTION |
| | LKE | LOCK FAIL, LOCAL←LOCK ADDRESS, LOCAL←ULL, OTHER←LKS |
| | LKS | LOCK FAIL, LOCAL←LOCK ADDRESS, LOCAL←ULL |
| | ULL | LOCK FAIL, LOCAL←LOCK ADDRESS, LOCAL←ULL |
| | NON | LOCK SUCCESS, LOCAL←LOCK ADDRESS, LOCAL←LKE |

FIG. 16

| STATE | LOCAL | OTHER |
|---|---|---|
| ULS | UNLOCK | (UNKNOWN) |
| ULE | UNLOCK | UNLOCK |
| SLK | LOCK | UNLOCK |
|  | UNLOCK | LOCK |
| RSV | LOCK | UNLOCK |
|  | UNLOCK | LOCK |

FIG. 18

| LOCAL | OTHER | ACTION FOR UNLOCK |
|---|---|---|
| RSV | X | LOCAL←ULE |
| SLK | RSV | LOCAL←ULS<br>OTHER←ULE |
|  | SLK | LOCAL←ULS<br>OTHER←ULS |
|  | ULE | — |
|  | ULS OR NON | LOCAL←ULS |
| ULE, ULS, OR NON | X | — |

FIG. 17

| LOCAL | OTHER | ACTION FOR LOCK |
|---|---|---|
| SLK OR RSV | X | LOCK FAIL |
| ULE | X | LOCK SUCCESS, LOCAL←RSV |
| ULS | SLK | LOCK FAIL, LOCAL←RSV |
| | RSV | LOCK FAIL, LOCAL←RSV, OTHER←SLK |
| | ULS | LOCK SUCCESS, LOCAL←RSV OTHER←SLK OR NO ACTION |
| | ULE | LOCK SUCCESS, LOCAL←RSV OTHER←ULS OR SLK |
| | NON | LOCK SUCCESS, LOCAL←RSV |
| NON | SLK | LOCK FAIL, LOCAL←LOCK ADDRESS, LOCAL←RSV |
| | RSV | LOCK FAIL, LOCAL←LOCK ADDRESS, LOCAL←RSV, OTHER←SLK |
| | ULS | LOCK SUCCESS, LOCAL←LOCK ADDRESS, LOCAL←RSV, OTHER←SLK OR NO ACTION |
| | ULE | LOCK SUCCESS, LOCAL←LOCK ADDRESS, LOCAL←RSV, OTHER←ULS OR SLK |
| | NON | LOCK SUCCESS, LOCAL←LOCK ADDRESS, LOCAL←RSV |

X = DON'T CARE

LOCK CONTROL FOR A SHARED MAIN STORAGE DATA PROCESSING SYSTEM

BACKGROUND OF THE INVENTION

The present invention relates to a lock control for a data processing system, more particularly to a lock control in a data processing system with a plurality of data processing units sharing a main storage.

In a data processing system, a plurality of data processing units often share a main storage. For the above constitution, sometimes, the predetermined data processing unit has to access exclusively the data stored in a shared region, for a predetermined period of time. When a certain data processing unit operates to add "one" to the data stored in a certain shared region, for example, an access to this data from other data processing units must be inhibited, during a processing period that the data of the shared region is read out to add "one" and then the data is written to the shared region again. Without such control, an update result of data is not secured.

To secure this exclusive access, a lock variable is used. When accessing the shared region, the lock variable has to be checked to confirm that it is not in a lock state. If the lock variable is in an unlock state, it is changed to be the lock state to access to a corresponding shared region. After an exclusive processing is completed, the lock variable is restored to the unlock state. The control explained as above is called a lock control.

U.S. Pat. No. 4,733,352, for example, disclosed a data processing system including a plurality of storage control units, which perform a lock control to access a main storage from a plurality of processing units. In this prior art disclosed by the United States Patent, states of the lock variable are expressed using two ways: one is that a lock is acquired, and the other is that the lock is not acquired. The former is called a lock state, the latter is called an unlock state. Therefore, in a certain storage control unit, if a request for acquisition of the lock is received, i.e. a lock request, and if a request for releasing the lock is received, i.e. an unlock request, checking a lock variable state or updating states of the lock variable in other storage control units is caused. For example, when a lock request is issued from a certain data processing unit and a lock variable held in a storage control unit connected thereto indicates an unlock state, the lock variable states in the other storage control units have to be indexed. Then, if indexing the lock variable, states reveals that they are in a lock state, the lock request is returned as failed, and the data processing unit has to issue the lock request, again. These operations are called a spin lock.

As described above, in the prior art, at the time when the data processing unit issues a new lock request, if a lock variable in this storage control unit indicates an unlock state, a lock variable in other storage units must be accessed to acquire a lock. For this reason, a drawback, in the prior art is that a long period of time is required for acquiring the lock; the causes bus traffic to increase due to unnecessary bus access.

SUMMARY OF THE INVENTION

The object of the present invention is to provide an improved lock control for sharing a main storage.

Another object of the present invention is to provide a lock control which operates locally so as to realize a high-speed operation.

A plurality of data processing units sharing a main storage in a data processing system, having a plurality of lock control units for controlling states of a lock variable concerning at least one of said plurality of data processing units, each of said lock control units comprising:

a state register for registering a state of the lock variable, wherein said state register represents the state of said lock variable as a specified state indicating that a lock is not acquired in any one of the lock control units; and a lock request controller for controlling the state of the lock variable registered in said state register, wherein said lock request controller controls so that at most one of said plurality of lock control units has the specified state.

BRIEF DESCRIPTION OF THE DRAWINGS

The above objects and advantages of the present invention will be apparent by describing the preferred embodiment of the present invention in detail with reference to the attached drawings, in which:

FIG. 4 is a table showing states of a lock variable in a first embodiment according to the present invention;

FIG. 5 is a table showing operations at the time of issuing of a lock request in the first embodiment according to the present invention;

FIG. 6 is a table showing operations at the time of issuing of an unlock request in the first embodiment according to the present invention;

FIG. 7 is a diagram showing concretely operations in the first embodiment according to the present invention;

FIG. 8 is a table showing states of a lock variable in a second embodiment according to the present invention;

FIG. 9 is a table showing operations at the time of issuing of a lock request in the second embodiment according to the present invention;

FIG. 10 is a table showing operations at the time of issuing of an unlock request in the second embodiment according to the present invention;

FIG. 12 is a table showing states of a lock variable in a third embodiment according to the present invention;

FIG. 13 is a table showing operations at the time of issuing of a lock request in the third embodiment according to the present invention;

FIG. 14 is a table showing operations at the time of issuing of an unlock request in the third embodiment according to the present invention;

FIG. 16 is a table showing states of a lock variable in a fourth embodiment according to the present invention;

FIG. 17 is a table showing operations at the time of issuing of a lock request in the fourth embodiment according to the present invention;

FIG. 18 is a table showing operations at the time of issuing of a lock request in the fourth embodiment according to the present invention.

DETAILED DESCRIPTION OF THE PREFERRED EMBODIMENTS

First of all, an embodiment of a data processing system applied to the present invention will be described with reference to the drawings, in detail.

Figure 1:
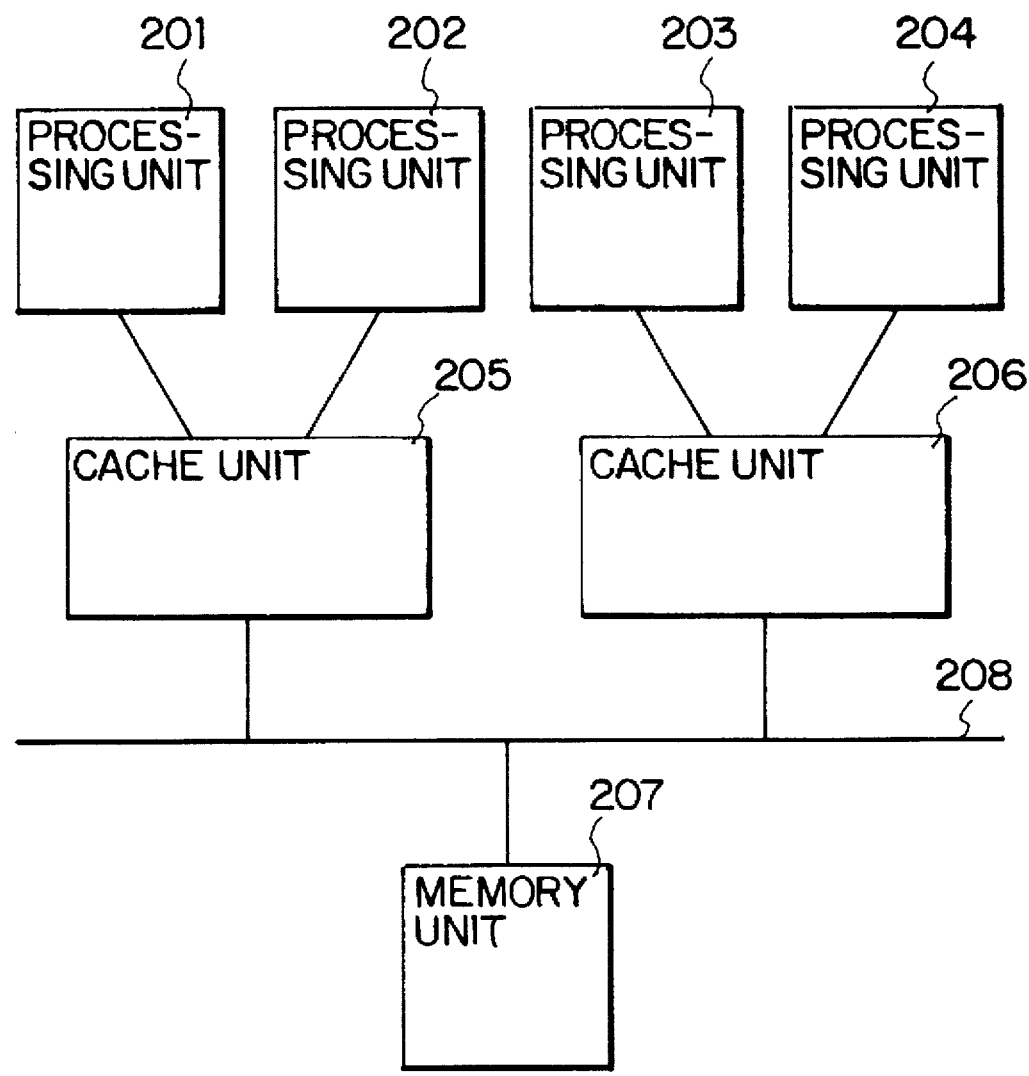
FIG. 1 is a diagram showing an entire constitution of a data processing system applied to the present invention.

Referring to FIG. 1, a data processing system applied to the present invention comprises four processing units 201 to 204 sharing a storage unit 207. The processing units 201 and 202 are connected to a cache unit 205, and the processing units 203 and 204 are connected to a cache unit 206. The cache units 205 and 206 are connected to a storage unit 207 via a system bus 207, respectively. The cache unit 205 works as a cache memory for the processing units 201 and 202 connected thereto, and the cache unit 206 works as the cache memory for the processing units 203 and 204 connected thereto. Moreover, they hold lock variables. The system bus 208 includes an address bus and the data bus, the address bus can operate independently of the data bus. In a lock request for requesting an acquisition of a lock and an unlock request for requesting a release of the lock, only the address bus is used. Further, the system bus 208 includes a bus for transmitting a cache information. A possibility of an acquisition of the lock is transmitted by utilizing the system bus 208.

Figure 2:
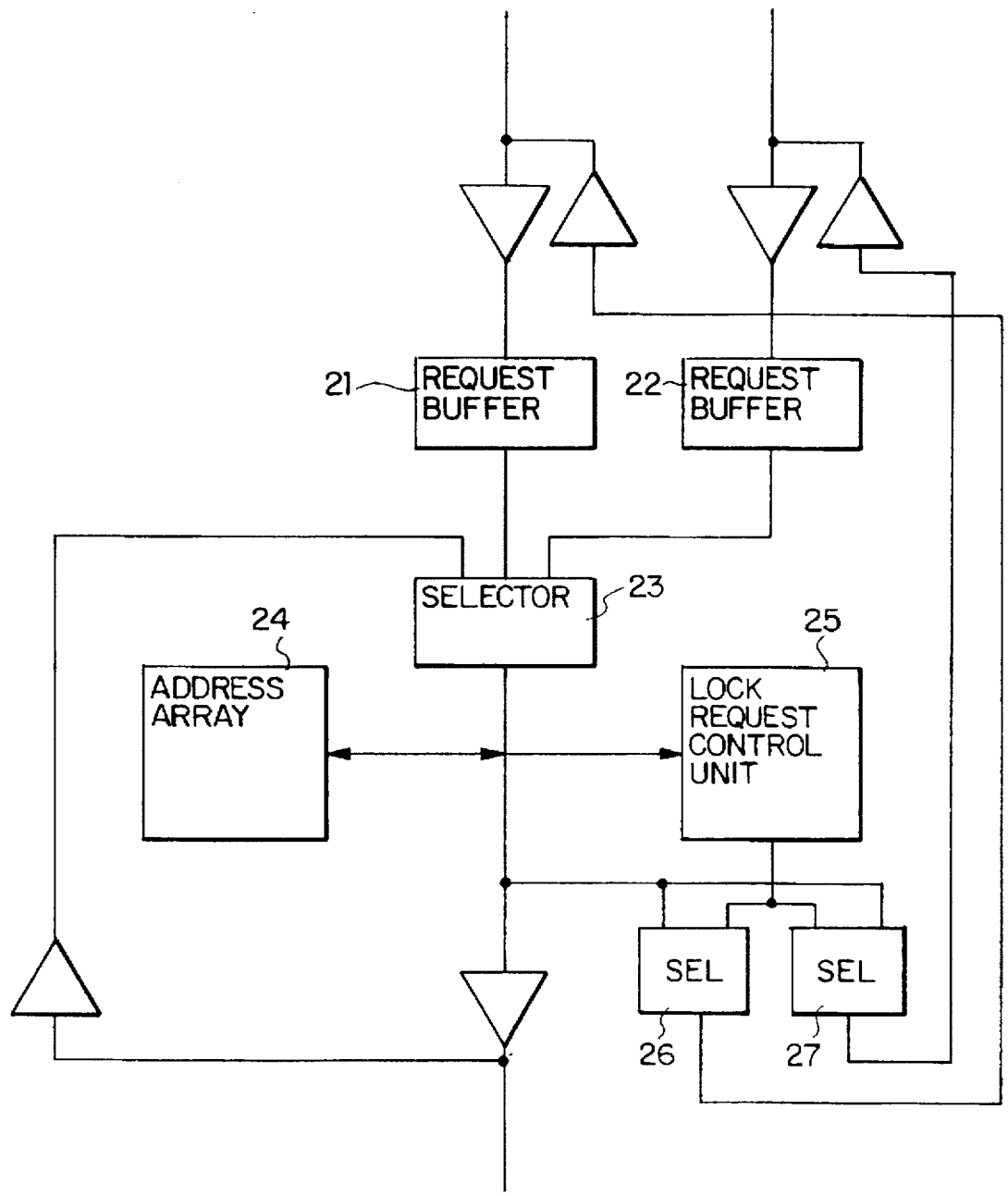
FIG. 2 is a diagram showing a constitution of a cache unit incorporated in the data processing unit of the present invention.

Referring to FIG. 2, a constitution of the cache units 205 is as follows. The units 205 and 206 comprise request buffers 21 and 22 for holding a request from the processing units 201 to 204, a selector 23 for selecting one of a request issued in the system bus 208, the request buffers 21 and 22, an address array 24 of the cache memory, a lock request control unit 25, and selectors 26 and 27 for selecting a request selected by the selector 23 or a lock judging result from the lock request control unit 25.

The request buffers 21 and 22 hold a plurality of requests. They work as a First-In First-Out (FIFO) buffer. The selector 23 selects one of three inputs in accordance with a prescribed rule. The selector 23 can use a round robin scheduling method. Further, the selector 23 can use a method in which a request from the system bus is dealt with the highest priority. The address array 24 has a constitution similar to that of a normal cache memory, and stores tag addresses corresponding to each of entries of a data memory (not shown).

Selectors 26 and 27 select the lock judging result from the lock request control unit 25 in accordance with the phase of reply for lock requests.

Selectors 26 and 27 select output of the selector 23 in accordance with the phase of the cache coherency control.

Figure 3:
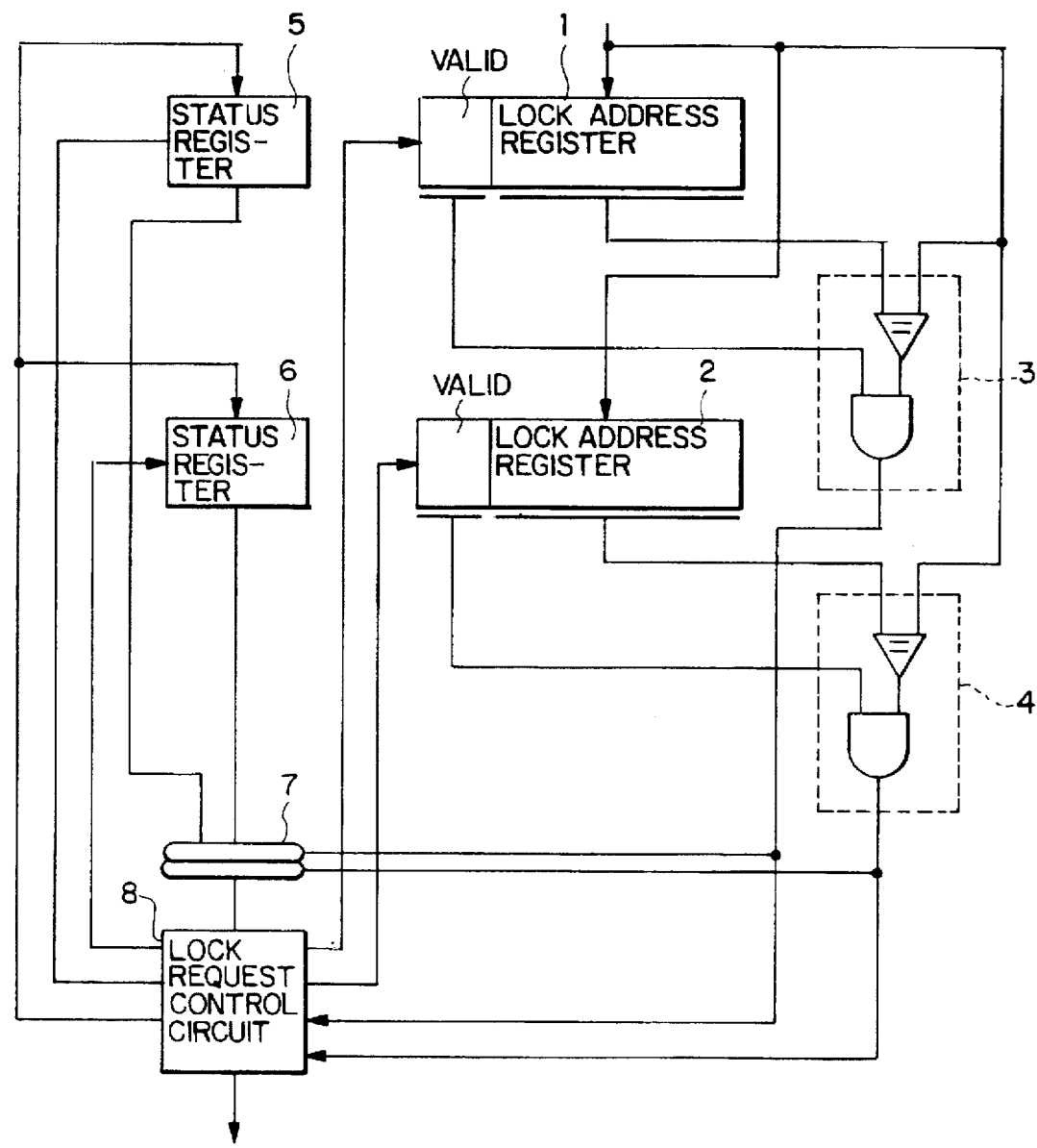
FIG. 3 is a diagram showing a constitution of a lock request control unit of the present invention.

Referring to FIG. 3, the lock request control unit 25 comprises lock address registers 1 and 2 for storing an address of a lock variable concerning the request selected by the selector 23, lock status registers 5 and 6 for storing lock states corresponding to each of the lock variables stored in the lock address registers 1 and 2, lock address coincide detectors 3 and 4 for inputting the address of the lock variable from the selector 23 and the addresses stored in the registers 1 and 2 to detect a coincidence of them, a selector 7 for selecting data in one of the lock status registers 5 and 6 corresponding to the entries detected by the lock address register 5 or 6, and a lock request control circuit 8.

Next, the first embodiment of the data processing system according to the present invention will be described with reference to the drawings below.

Referring to FIG. 4, a lock variable occupies one of three states expressed as LCK, ULS and ULE, respectively. The symbol LCK indicates the state that a data processing unit connected to a cache unit has acquired a lock and other processing units have not acquired locks. The symbol ULS indicates the state that a data processing unit connected to a cache unit has not acquired a lock and acquisition of locks of other data processing units are unknown. Further, the symbol ULE indicates the state that no data processing units connected to the cache units have acquired locks. If the lock variable is in the ULE state, it is possible to acquire the lock, without confirming the state of the lock variable stored in other cache units again.

Operations of the first embodiment of the data processing system according to the present invention, at the time when a lock request is issued from the data processing unit, will be described with reference to a table shown in FIG. 5 below.

Referring to FIG. 5, the most-left column indicates the states of the lock variable stored in a local cache unit connected to the data processing units having issued the lock requests. The middle column indicates the states of the lock variables in the cache units other than the local cache unit of the left-most column. In addition, the right-most column indicates actions in these states of the lock variables. Note that the cache units connected to the data processing units having issued the request are called, hereinafter, "local cache units".

If the lock variable held in the local cache unit is in an LCK state, for example, it means that a lock is acquired already so that the lock control unit transmits a result of "successfully locked" to the data processing unit. Further, if the lock variable held in the local cache unit is in a ULE state, it is found that all of the data processing units have not acquired the lock, thus, the lock control unit transmits the result of "successfully locked" to the data processing unit and changes the lock variable to an LCK state.

In addition, if the lock variable held in the local cache unit is in a ULS state, lock variables held in cache units other than the local cache unit have to be referred to. Specifically, if the lock variables held in the cache units other than the local cache unit are in the LCK state, the control unit transmits the result of "unsuccessfully locked" to the data processing unit. If the lock variables held in the cache units other than the local cache unit are in an ULE state, the lock control unit transmits the result of "successfully locked" to the data processing unit and changes the lock variable held in the local cache unit an LCK state, making the lock variables held in the cache units other than the local cache unit in an ULS state. If the lock variables held in the cache units other than the local cache unit is in the ULS state or this lock variable is not registered in the lock address register, the lock control unit transmits the result of "successfully locked", while the lock control unit makes the lock variable held in the local cache unit the LCK state.

Moreover, if a lock variable corresponding to a local cache unit is not registered in the local cache unit, the processing is carried out in substantially the same manner as in the case where the lock variable held in the local cache unit is in the ULS state. Note that, in this case, an address of the lock variable corresponding to the lock request is registered in a lock address register. At this time, if the lock can be acquired, the lock variable is set at the LCK state, and if the lock cannot be acquired, the lock variable is set at the ULS state.

Operations of the first embodiment of the present invention, at the time when an unlock request is issued from a data processing unit, will be described with reference to a table shown in FIG. 6. Referring to the table shown in FIG.

6, the left column Shows states of a lock variable held in a cache unit connected to a data processing unit which issued a lock request. The right column shows actions for a lock request corresponding to the states shown in the left column. Specifically, if a lock variable held in a local cache unit is in an LCK state, a lock request control unit changes the lock variable to an ULE state. When a lock is not acquired, an unlock request is never normally generated, therefore the lock variable held in a local cache unit is never in an ULE or ULS state. Further, the unlock request is never normally generated, when the lock variable is not registered.

The features of the first embodiment will be described with reference to FIG. 7. First of all, suppose that a lock variable held in a cache unit 205 of the left side is in an LCK state, and a lock variable held in a cache unit 206 of the right side is in an ULS state. When an unlock request is issued in the cache unit 205 of the left side, the state of the lock variable held in the cache unit 205 is updated from the LCK to the ULE (see FIG. 6). With this situation, when the lock request is issued in the cache unit 205 again, a lock can be acquired without depending on the state of the cache unit 206. Specifically, the state of the lock variable in the cache unit 205 is updated to the LCK (see FIG. 5).

As described above, according to the data processing system of the first embodiment of the present invention, an aquisition of the lock after a lock release, with a high speed, is attained, by providing the state ULE of the lock variable.

Subsequent to the first embodiment, the second embodiment of the present invention will be described with reference to the drawings.

Referring to FIG. 8, a lock variable in the second embodiment takes four states LCK, ULS, ULE, and ULL. Specifically, the feature of the second embodiment is that the ULL state is added to the states in the first embodiment. The state ULL indicates the state that a data processing unit connected to a cache unit does not secure a lock and any one of the other data processing units secures the lock. When the security of the lock according to a lock request is failed, the lock variable held in a cache unit changes to the state ULL. Thus, this cache unit controls so as not to issue a further lock request for other cache units.

Referring to FIG. 9, operation of the second embodiment, when the lock request is issued from a data processing unit, will be described. When referring to FIG. 9, the most-left column indicates states of a lock variable held in a local cache unit and the middle column indicates states of a lock variable held in cache units other than the local cache unit, similarly as in FIG. 5. Further, the most-right column indicates actions in the states of the lock variables in the most-left and right columns.

If a lock variable held in a local cache unit is in the state ULL, a lock is acquired in a cache unit other than a local cache unit so that a lock control unit transmits a result of "unsuccessfully locked" to a processing unit.

When the lock variable held in the local cache unit is in the state ULS, states of lock variables of cache units other than the local cache unit are indexed. Specifically, when the lock variable held in the cache unit other than the local cache unit is either in the LCK state or in the ULL state, the lock control unit transmits the result of "unsuccessfully locked" to the data processing unit. The lock control unit changes the lock variable held in the local cache unit to the ULL state. When the lock variable held in the cache unit other than the local cache unit is either in the ULE state or in the ULS state, the lock control unit transmits the result of "successfully locked" to the data processing unit. The lock control unit makes the lock variable held in the local cache unit the state LCK, and changes the lock variable held in the cache unit other than the local cache unit the state ULL.

When a lock variable is not registered in a local cache unit, the substantially same processing is done as in the case where a state of the lock variable in the local cache unit is in the state ULS. In this case, please note that an address of the lock variable corresponding to the lock request is registered in a lock address register.

Operations of the second embodiment, at the time when an unlock request is issued from a data processing unit, will be described with reference to FIG. 10. Referring to FIG. 10, the most-left column indicates states of a lock variable in a local cache unit, the middle column indicates states of a lock variable in a cache unit other than the local cache unit. The most-right column indicates actions in these states. Specifically, if the lock variable in the local cache unit is in the state LCK, a lock request control unit makes the lock variable the state ULE. At this time, if the lock variable in the cache unit other than the local cache unit is in the state ULL, the state of this lock variable is changed to the state ULS. Thus, the cache unit rendered in the state ULS becomes capable of outputting the lock request, again.

Figure 11:
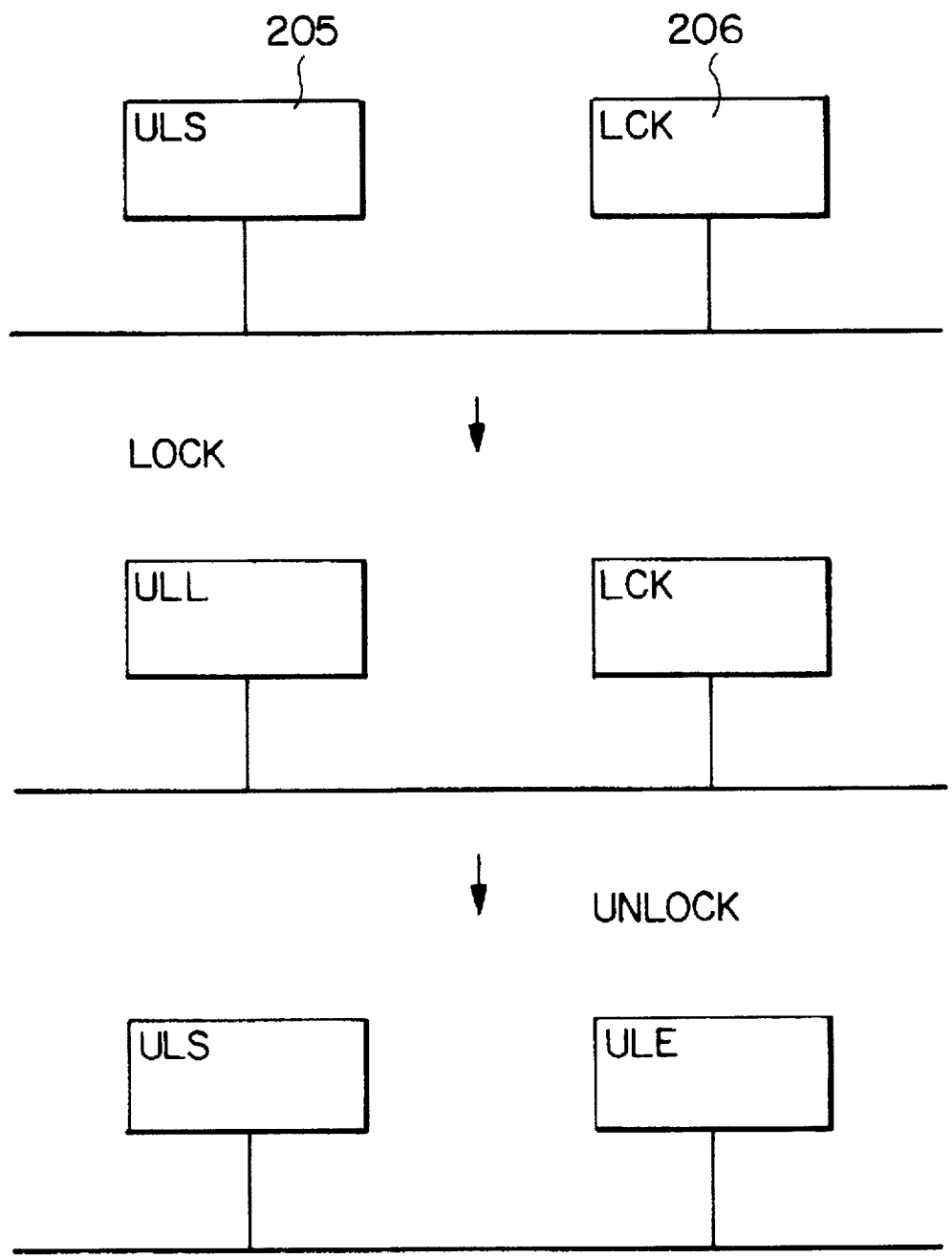
FIG. 11 is a diagram showing concretely operations in the second embodiment according to the present invention.

The features of the second embodiment will be described with reference to FIG. 11.

First of all, when the lock variable in the cache unit 205 of the left side is in the state ULS and the lock variable in the cache unit 206 of the right side is in the state LCK, the issuance of the lock request in the cache unit 205 results in failure of the lock and updating of the state in the cache unit 205 from ULS to ULL (see FIG. 9). Thus, the cache unit 205 of the left side stops issuing the lock request; this state is released when an unlock request is issued in the cache unit 206 of the right side. Specifically, in this case, since the state of the lock variable in the cache unit 205 of the left side changes to the state ULS (see FIG. 10), the cache unit 205 becomes capable of issuing the lock request again.

As described above, according to the second embodiment of the present invention, a useless issue of the lock request following a failure of the security of the lock can be suppressed because the state ULL is added as an additional state for the lock variable of the first embodiment.

The third embodiment of the present invention will be described with reference the drawings below.

Referring to FIG. 12, a lock variable in the third embodiment has a possibility to be any one of states LKS, LKE, ULS, ULE, and ULL. Specifically, the third embodiment of the present invention has the feature that two states LKS and LKE are provided instead of the state LCK in the second embodiment. The state LKS indicates that a lock is secured by a data processing unit connected to the cache unit in question and any of the lock variables in other cache units might be in the state ULL. Further, the state LKE indicates the state that a lock is acquired by a data processing unit connected to the cache unit; in this state LKE, it is confirmed that all lock variables in other cache units are not in the stage ULL. For the cache unit, a provision of the state LKE eliminates checking the states of other cache units, at the time of the unlock state.

Operations of the third embodiment, when a lock request from a data processing unit is issued, will be described below with reference to FIG. 13. Referring to FIG. 13, the most-left column indicates states of lock variables in a local cache unit and the middle column indicates states of lock variables in cache units other than the local cache unit, similarly as in the case of FIG. 5. Further, the most-right column indicates actions done under the conditions illustrated in the most-left and middle columns.

If the lock variable in the local cache unit is in the state ULE, since it is confirmed that the lock is not acquired in any of the cache units, the result of "successfully locked" is transmitted to the processing unit and the lock variable in the local cache unit is changed to the state LKE.

If the lock variable in the local cache unit is in the state ULS, the lock variables in the cache units other than the local cache unit are referenced. Specifically,. if the lock variable in the cache unit other than the local cache unit is in the state LKS or ULL, the lock control unit transmits the result of "unsuccessfully locked" to the data processing unit and changes the lock variable to the state ULL. Further, if the lock variable in the cache unit is in the state ULE or ULS, the lock control unit transmits the result of "successfully locked" to the data processing unit, changes the lock variable in the local cache unit to the state LKE, and changes the lock variable in the cache unit other than the local cache unit to the state ULS. It should be noted that when the lock variable is either in the ULS state or is not registered in the local cache unit, as demonstrated in FIG. 13, no registration is required when the lock value of the cache unit other than the lock cache unit is in the state ULS since the lock variable in the local cache unit is already registered.

When the lock variable in question is not registered in the local cache unit, the processing is substantially similar as when the lock variable in the local cache unit is in the state ULS. It should be noted that when lock variable is not registered in the local cache unit and when the local cache unit is in the ULS state, an address of the lock variable corresponding to the lock request is registered in a lock address register.

Operations of the third embodiment, at the time when an unlock request is issued from the data processing unit, will be described with reference to FIG. 14. Referring to FIG. 14, the most-left column indicates states of lock variables in a local cache unit and the middle column indicates states of lock variables in cache units other than the local cache unit.

The most-right column indicates actions done under the conditions illustrated in the most-left and middle columns. Specifically, if the lock variable in the local cache unit is in the state LKE, the lock request control unit changes the lock variable to the state ULE, without depending the states of the lock variables in other cache units.

Figure 15:
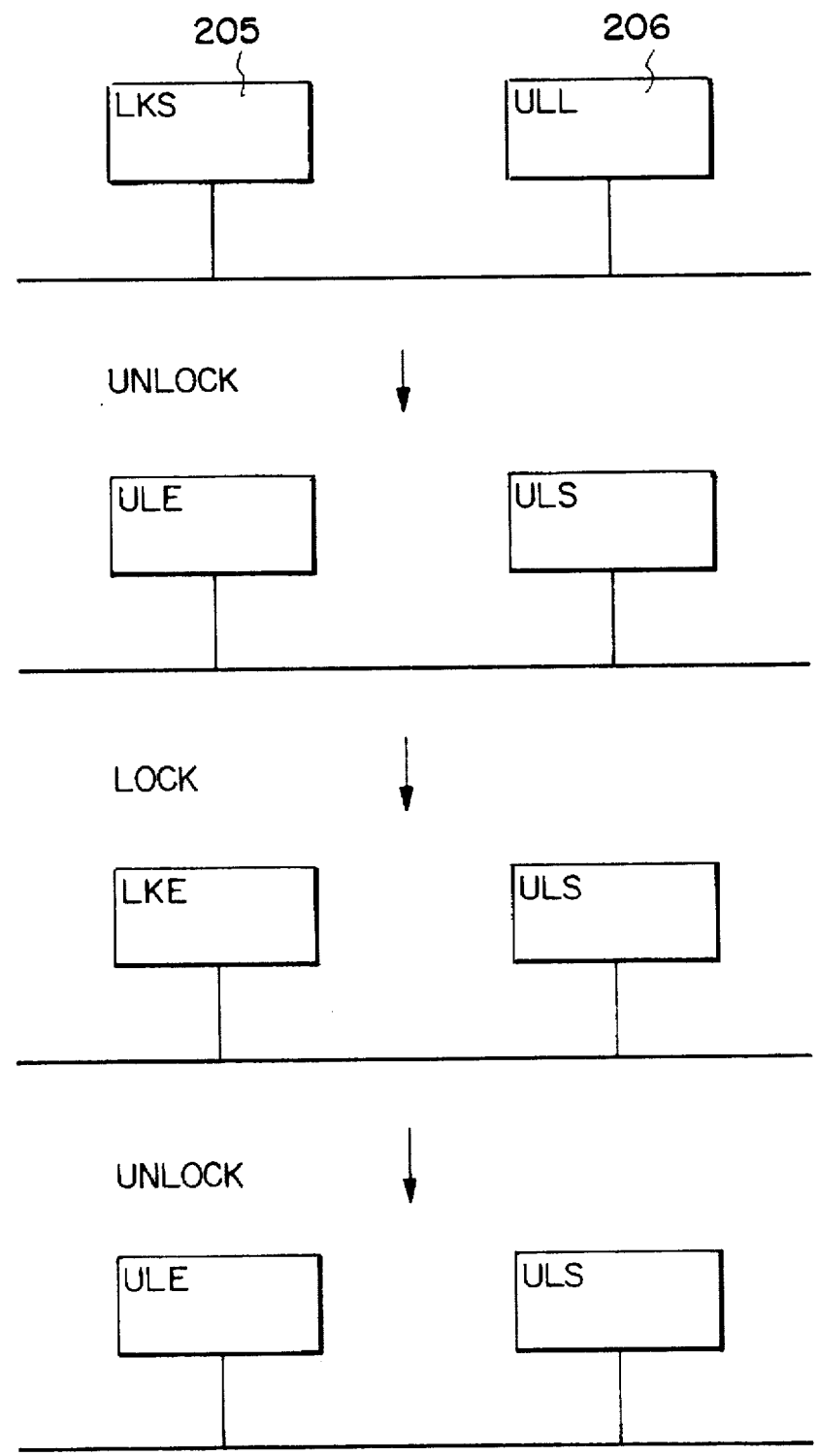
FIG. 15 is a diagram showing concretely operations in the third embodiment according to the present invention.

The features of the third embodiment will be described with reference to FIG. 15. First of all, suppose that the lock variable in the cache unit 205 of the left side is in the state LKS and the lock variable in the cache unit 206 of the right side is in the state ULL, if an unlock request is issued in the cache unit 205, the state of the lock variable is updated to the state ULE and the state of the lock variable in the cache unit 206 is updated to the state ULS (see FIG. 14). In this situation, when a lock request is issued in the cache unit 205, a lock is acquired in the cache unit 205 without depending on the state of the other cache unit 206. The effect of the third embodiment is similar to that of the first embodiment. As the result, the lock variable in the cache unit 205 becomes the state LKE; then, in this situation, when an unlock request is issued in the cache unit again, the state of the lock variable in the cache unit 205 is updated to the state ULE (see FIG. 14). In this case, the action for the other cache unit is not required, as in the case of the first unlock request.

As described above, according to the third embodiment of the present invention, by introducing the states LKE and LKS instead of the state LCK, the third embodiment of the present invention has the effect that an operation for other cache units is not required, to release the lock from the state LKE.

The fourth embodiment of the present invention will be described with reference to the drawings below.

Referring to FIG. 16, a lock variable in the fourth embodiment takes any one of four states ULS, ULE, SLK and RSV. Specifically, the feature of the fourth embodiment is that the two states SLK and RSV are provided on behalf of the state LCK in the first embodiment. These states SLK and RSV represent that a lock is acquired in at least one of the cache units of the system. A cache unit acquiring the lock might be itself or the other cache units. The states SLK and RSV differ from each other, that, when the lock is released., the state SLK is changed to the state ULS and the state RSV is changed to the state ULE.

By providing the state RSV, a lock variable, to be changed to the state ULE at the time of the unlock, can be reserved.

Operations for a lock, of the fourth embodiment of the present invention, at the time when a lock request is issued from a data processing unit, will be described with reference to FIG. 17. Referring to FIG. 17, the most-left column indicates states of lock variables in local cache units and the middle column indicates states of lock variables in cache units other than the local cache units. The most-right column indicates actions done under the conditions illustrated in the most-left and middle columns.

When the lock variable in the local cache unit is in the state SLK or the state RSV, the lock control unit transmits the result of "unsuccessfully locked" since a lock is acquired in any one of the cache units.

On the other hand, when the lock variable in the local cache unit is in the state ULE, the lock is locked successfully so that the lock variable in the local cache unit becomes the state RSV, without depending on the state of the other cache units.

When the lock variable in the local cache unit is in the state ULS, the states of the lock variables in the cache units other than the local cache unit are referenced to judge whether the lock is acquired successfully or not. Specifically, "successfully locked" or "unsuccessfully locked" is judged for states SLK, RSV, ULS, and ULE, and a state indicating registering no lock variable. It should be noted that the state of the lock variable in the local cache unit becomes the state RSV, without depending on the judging result, since the lock variable is reserved so as to be in the state ULE at the time of the unlock.

When the lock variable corresponding to the local cache unit is not registered in the local cache unit, the operations is done in a similar manner to the above described manner. It should be noted that an address of the lock variable corresponding to the lock request in question is registered in the lock address register, in this case.

Operations of the fourth embodiment, at the time when an unlock request is issued from a data processing unit, will be described with reference to FIG. 18. Referring to FIG. 18, the most-left column indicates states of lock variables in local cache units and the middle column indicates states of lock variables in cache units other than the local cache units.

The most-right column indicates actions done under the conditions illustrated in the most-left and middle columns. Specifically, when the lock variable in the local cache unit is in the state RSV, the lock variable in the local cache units is changed into the state ULE by the lock request control unit, regardless of the state of the lock variable in the other cache unit. Further, when the lock variable in the local cache unit is in the state SLK, the state of the lock variable in the local cache unit becomes the state ULS. In this case, if the lock variable in the cache unit other than the local cache unit is in the state RSV, it becomes the state ULE, and if the lock variable therein is in the state SLK, it becomes the state ULS.

Figure 19:
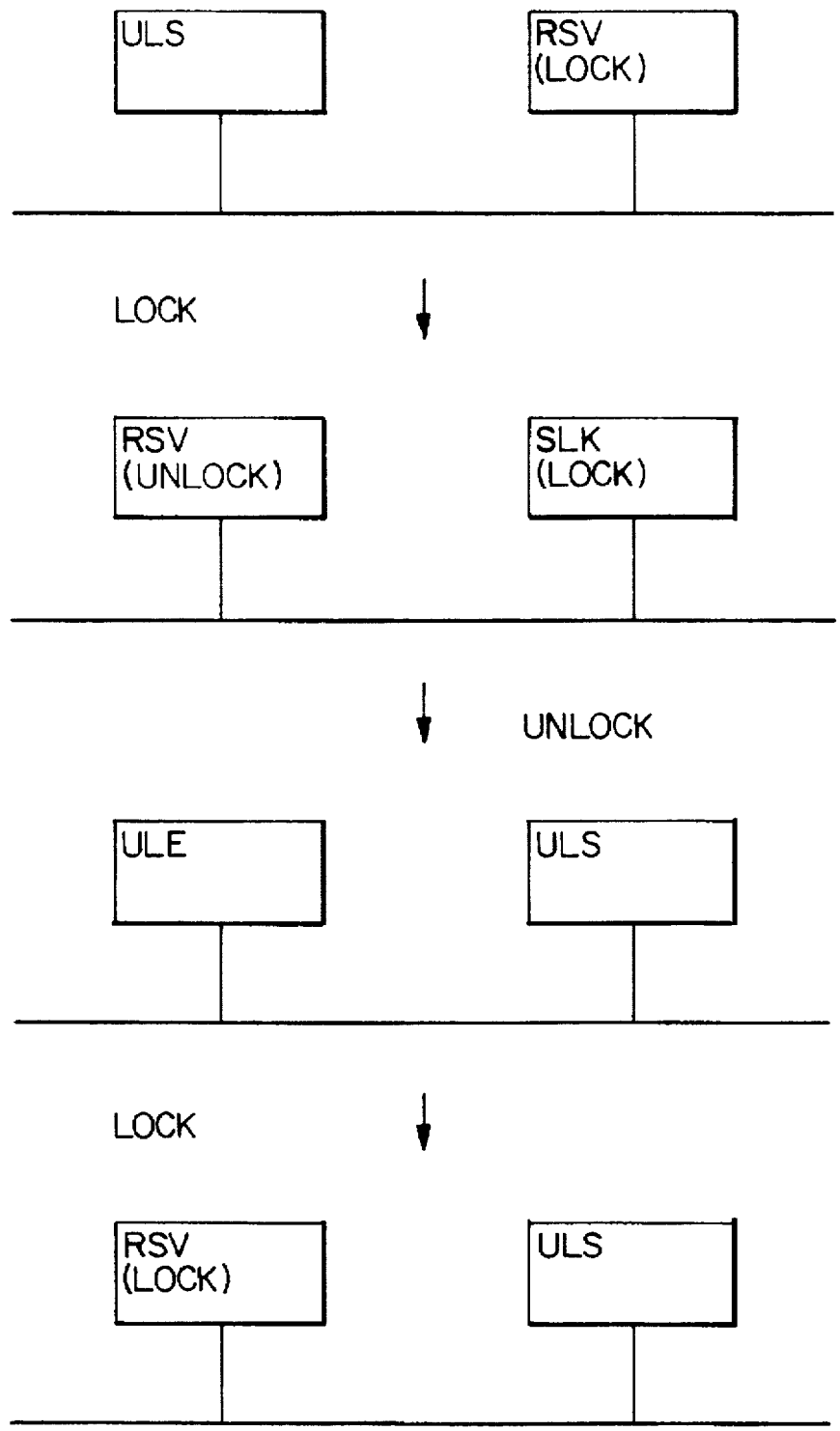
FIG. 19 is a diagram showing concretely operations in the fourth embodiment according to the present invention.

The features of the fourth embodiment will be described with reference to FIG. 19. First of all, suppose that the lock variable in the cache unit 205 of the left side is in the state ULS, the lock variable in the cache unit 206 of the right side is in the state RSV, and a lock is acquired. If a lock request is issued in the cache unit 205, the acquisition of the lock fails, the lock variable in the cache unit 205 is updated from the ULS to the state RSV and the state of the lock variables in the cache unit 206 is updated to the state SLK (see FIG. 17). It should be noted that the lock remains to be acquired in the cache unit 206. In this situation, when an unlock request is issued in the cache unit 206, the state of the lock variable in the cache unit 206 becomes the state ULS and the state of the lock variable in the cache unit 205 becomes the state ULE (see FIG. 18). Thus, when a lock request is issued in the cache unit 205, subsequently, a lock is acquired in the cache unit 205, without depending on the state of the other cache unit 206. Then, the state of the lock variable in the cache unit 205 is updated to the state RSV (see FIG. 17).

Thus, according to the fourth embodiment of the present invention, by providing the state RSV on behalf of the state LCK used in the first embodiment, the cache unit to be set in the state ULE after a release of the lock can be reserved so that the lock can be acquired after the release of the lock with high speed and flexibility.

As described above, according to the present invention, by proving states of the lock variables corresponding to the lock address register, it is necessary to reference operation of lock variables in a second cache unit which is not connected directly to a central data processing unit having issued an unlock request.

As a result, the lock can be acquired with high speed. Moreover, an increase in bus traffic can be suppressed by abolishing the unnecessary bus access operation.

Additional advantages and modifications will readily occur to those skilled in the art. Therefore, the invention in its broader aspects is not limited to the specific details, representative devices, and illustrated examples shown and described herein. Accordingly, various modifications may be made, without departing from the spirit or scope of the general inventive concept as defined by the appended claims and their equivalent.

What is claimed is:

1. A plurality of data processing units sharing a main storage in a data processing system, having a plurality of lock control units for controlling states of a lock variable concerning at least one of said plurality of data processing units, each of said lock control units comprising:

a state register for registering a state of the lock variable, wherein said state register represents the state of said lock variable as one of a first state indicating that a local lock control unit acquires no lock, a second state indicating that all of the control units acquire no lock, a third state indicating that the local lock control unit acquires no lock and another lock control unit acquires the lock, a fourth state indicating that the local lock control unit acquires the lock and another lock control unit may be in the third state, and a fifth state indicating that the local lock control unit acquires the lock and the other lock control units are not in the third state; and a lock request controller for controlling the state of the lock variable registered in said state register, wherein:

said lock request controller judges that the lock is acquired without referencing the state of the lock variable in other lock control units when a lock request concerning the lock variable in the second state is issued, and said lock request controller controls so that when an unlock request concerning a lock variable of the fifth state is issued, the unlock request is not issued to another lock control unit.

2. A plurality of data processing units sharing a main storage in a data processing system, having a plurality of lock control units for controlling states of a lock variable concerning at least one of said plurality of data processing units, each of said lock control units comprising:

a state register for registering a state of the lock variable, wherein said state register represents the state of said lock variable as one of a first state indicating that a local lock control unit acquires no lock, a second state indicating that all of the control units acquire no lock, a third state indicating that any lock control unit acquires the lock and the local lock control unit will be in the first state upon unlock request, and a fourth state indicating that any lock control unit acquires the lock and the local lock control unit will be in the second state upon unlock request; and a lock request controller for controlling the state of the lock variable registered in said state register, wherein said lock request controller judges that the lock is acquired without referencing the state of the lock variable in other lock control units when a lock request concerning the lock variable in the second state is issued.

* * * * *